United States Patent [19]
Siglow
[11] 3,747,003
[45] July 17, 1973

[54] CIRCUITRY FOR DEMODULATION OF PHASE DIFFERENCE MODULATED DATA SIGNALS

[75] Inventor: Joachim Siglow, Wolfratshausen, Germany

[73] Assignee: Siemens Aktiengesellschaft, Berlin, Munich, Germany

[22] Filed: Sept. 24, 1971

[21] Appl. No.: 183,322

[30] Foreign Application Priority Data

Sept. 28, 1970 Germany .................. P 20 47 697.5

[52] U.S. Cl. ................ 329/104, 325/320, 328/110, 328/134, 329/50

[51] Int. Cl. ............................................ H04l 27/22

[58] Field of Search ...................... 329/50, 104, 137, 329/138; 325/320; 178/66, 67, 88; 328/134, 109, 110

[56] References Cited

UNITED STATES PATENTS

| | | | |
|---|---|---|---|
| 3,294,907 | 12/1966 | Heald | 325/320 X |
| 3,394,313 | 7/1968 | Ellis et al. | 178/67 X |
| 3,417,333 | 12/1968 | Atzenbeck | 325/320 |
| 3,418,585 | 12/1968 | Harnett | 328/134 |
| 3,472,960 | 10/1969 | Gutleber et al. | 178/67 |

*Primary Examiner*—Alfred L. Brody
*Attorney*—Birch, Swindler, McKie & Beckett

[57] ABSTRACT

A circuit is described for demodulating phase difference modulated data signals wherein data, in binary coded form, is transmitted by modulating a carrier with specific phase shifts, the magnitude of each phase shift corresponding with a predetermined data signal level or levels. The demodulator includes a reference oscillator which emits a frequency with *n*-valued phase difference modulation which has n times the value of the carrier frequency. (n being the expected number of shifts in the received signal) A frequency divider reduces the reference frequency down to the carrier frequency. An interrogation pulse is derived from the phase shift modulated carrier in the middle portion of a modulation segment, and the interrogation pulse causes the binary states, at that time, of the frequency divider to be coupled to a decoder. In the decoder the binary data signal is reformed. After the latter binary states have been coupled to the decoder, the interrogated divider stages are set to a position which corresponds to the phase state of the carrier oscillation at the moment of the interrogation and in accordance with the particular coding used.

7 Claims, 5 Drawing Figures

| t | φt | K1 | K2 | K3 | a1 | a2 | a3 |
|---|---|---|---|---|---|---|---|
| t1 – t2 | 0° | 1 | 1 | 1 | 0 | 1 | 1 |
| t2 – t3 | 45° | 0 | 1 | 1 | 0 | 1 | 0 |
| t3 – t4 | 90° | 1 | 0 | 1 | 1 | 1 | 0 |
| t4 – t5 | 135° | 0 | 0 | 1 | 1 | 1 | 1 |
| t5 – t6 | 180° | 1 | 1 | 0 | 1 | 0 | 1 |
| t6 – t7 | 225° (–135°) | 0 | 1 | 0 | 1 | 0 | 0 |
| t7 – t8 | 270° (–90°) | 1 | 0 | 0 | 0 | 0 | 0 |
| t8 – t9 | 315° (–45°) | 0 | 0 | 0 | 0 | 0 | 1 |

CIRCUITRY FOR DEMODULATION OF PHASE DIFFERENCE MODULATED DATA SIGNALS

BACKGROUND OF THE INVENTION

This invention relates to circuitry for the demodulation of phase difference modulated data signals in which the binary coded data are transmitted by specific phase shifts in the transmitted carrier frequency. Particular phase shifts are assigned in common to individual steps or to several steps.

There is a basic disadvantage in the transmission of binary signals by means of phase modulated carrier frequencies; namely, the reception is ambiguous. This leads, for example, to the possibility that the "0"-state and the "1"-state can be erroneously exchanged with each other. An auxiliary carrier frequency at a reference phase would be necessary for unambiguous demodulation of the signal at the receiving end. That is, in certain cases, principally in the transmission of binary signals using phase inversion modulation, an auxiliary carrier frequency can be recovered from the received carrier frequency signal, yet its phase position is indeterminate by 180°. This ambiguity carries over directly to the demodulated signal. With phase modulation with more than two state the uncertainty of reception increases accordingly, so that it can be interpreted four ways in the case of 4-valued phase modulation.

The aforementioned disadvantage can be avoided, as is known, by use of phase difference modulation. With phase difference modulation the data to be transmitted are not characterized by the phase position of the carrier frequency oscillation, but by a change in the phase position. In this connection, for example with binary modulation, the "zeros" are characterized by a phase change, the "ones", in contrast, by no phase change (or vice versa). With 4-valued modulation, two binary steps are expressed by a modulation process and, for example a phase jump of +90° denotes the step-pair (dibit) "01," a phase jump of −90° denotes the step-pair (dibit) "10," a phase jump of 180° denotes the step-pair (dibit) "11" and no phase jump denotes the step-pair (dibit) "00.".

Demodulation at the receiver proceeds with aid of a reference signal generator which generates a frequency corresponding to the unmodulated carrier oscillation and is synchronized to the received carrier frequency. Through a comparison, the phase shift is determined, and the correspondingly determined step-combination is available as received data.

For demodulation of the phase difference modulated data signals a demodulator is known which directs the received carrier frequency to one input of two receiving modulators and two reverse modulation stages, in particular ring modulators. The outputs of the two receiving modulators are connected to the other input of the two remodulation stages and are connected with the output terminals of the demodulator arrangement. A time delayed carrier recovery circuit is switched in between the outputs of the two receiving modulators, and this turns the two supplied carrier oscillations into two oscillations phase-shifted by ±45°. The carrier recovery circuit contains two mixing stages to which the output signals of the two remodulation stages are directed over phase-shifting filters and delay time networks. (See, for example, West German Patent No. 1,198,869).

The known circuits are constructed using analog techniques. LC universal filter elements of good quality are necessary so that the required time lag is achieved. Further, modulators and phase shifting elements constructed exactly symmetrically are necessary to obtain the required precision, and these may be realized only in LC-technology.

A digital demodulator for phase difference modulated signals has already been proposed, which has a reference oscillator emitting as many phases of the reference frequency as there are phase states determined for the transmission. A signal generator delivers, midway between two phase shifts, a scanning pulse with a duration of one period of the received carrier frequency and opens a first storage element for this period of time. The first crossover of the received carrier frequency during the scanning pulse period causes the reference phase of the reference oscillator, which agrees with the carrier frequency, to be placed into the first static store in binary form. Shortly before the next scanning pulse, the content of the first store is transferred into a second static store. A decoder forms the difference between the contents of the stores and emits the steps associated with the difference-value (phase shift), in accordance with the coding, at the output.

It is an object of this invention to provide a digital demodulator for phase difference modulated data signals which has an especially simple construction and can be built with the digital construction stages available commercially using integrated circuit techniques.

SUMMARY OF THE INVENTION

The foregoing and other objects are obtained in a novel demodulator circuit wherein a reference oscillator is utilized, which emits a frequency with n-valued phase difference modulation, having n times the value of the carrier frequency. A frequency divider which divides the reference frequency to the carrier frequency using binary divider stages is utilized. An interrogation pulse derived from a modulated carrier crossover is emitted in the middle region of a modulation segment and the interrogation pulse feeds the binary states of the divider stages into a decoder. The decoder reforms the binary data signal, and after the binary states are coupled into the decoder, the interrogated divider stages of the frequency divider are directed into the position which corresponds to the phase state of the carrier oscillation at the moment of the interrogation pulse, in accordance with the coding.

With digital construction stages, the phase of the received carrier oscillation can be evaluated directly, without transformation into the base band. The digital demodulator replaces the static store of the known circuit discussed hereinabove with a single dynamic store in which the phase position of the preceeding modulation segment is stored. A part of the frequency divider is used for the dynamic store which is corrected to the output of the reference oscillator. The simple construction of the demodulator enables a particularly simple circuit arrangement for the decoder. The demodulator can be expanded easily for reception of a greater number of phase shifts. The demodulator is a compatible device, so that merely through insignificant changes reception of phase difference modulated signals sent from other transmitters, not belonging to the transmission system in question, is possible.

The digital demodulator can be used in the same way for differential-coherent demodulation and mean value coherent modulation. In the process of demodulation according to the differential coherent principle, the information contained in a phase difference modulated data signal is obtained from the difference between the carrier oscillation phases in two successive modulation segments; whereas with the mean value coherent principle, the information is obtained from the difference between the phase received within a modulation segment and the phase which was derived from the phases received up to then as the mean for the preceeding modulation segment.

BRIEF DESCRIPTION OF THE DRAWINGS

The principles of the invention disclosed herein will be best understood by reference to descriptions of preferred embodiments given hereinbelow in conjunction with the drawings in which.

DETAILED DESCRIPTION OF THE DRAWINGS

Figure 1:
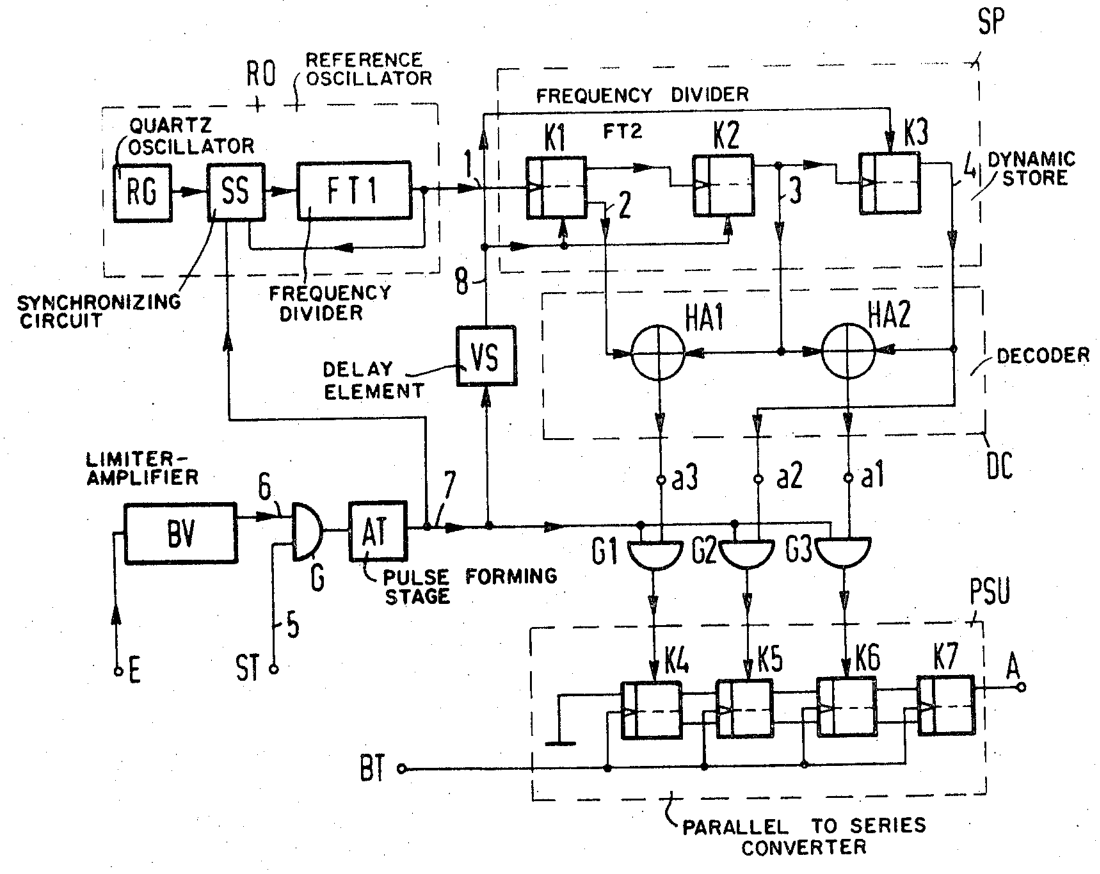
FIG. 1 shows a preferred embodiment of a demodulator constructed according to te prnciple of mean value coherent demodulation.

FIG. 1 shows a preferred embodiment of a demodulator according to the mean value-coherent demodulation principle for the reception of an 8-valued phase difference modulated carrier frequency signal. The reference oscillator RO consists of a quartz-stabilized oscillator, RG, a synchronizing circuit SS of known construction and a first frequency divider FT1, also of known construction, which divides the frequency of the oscillator into n times the carrier frequency, n being the number of phase shifts possible in the received signal. The oscillator RG emits a rectangular oscillation, so that phase correction through the synchronizing circuit and the frequency division with bistable switching stages can proceed simply. A second frequency divider FT2, necessary for the demodulation, includes switching stages K1, K2, and K3, which may be conventional flip-flop circuits. The carrier frequency originates at the output of stage K3. The three bistable stages form a dynamic store SP. The decoder DC consists of the two halfadders HA1 and HA2, which can be operated as exclusive-OR gates. The interrogation of the dynamic store SP takes place over the gates G1, G2, and G3. A parallel-series converter PSU, constructed of flip-flop circuits K4 through K7, is provided for decoding the binary data coupled thereto from the latter gates. A timing signal BT, which may be generated in any desired manner triggers flip-flops K4-K7 to move the data along this chain of flip-flops producing the data in series form at output terminal A.

Figures 2A, 2B:
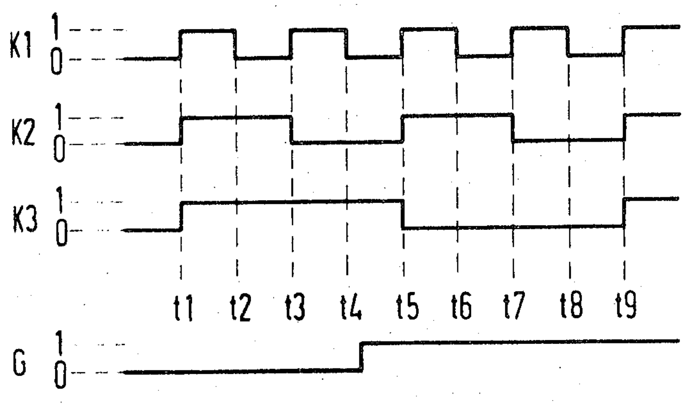
FIG. 2*a* shows the method of operation of the dynamic store and the blocks of time associated with the phase values for the FIG. 1 circuit.
FIG. 2*b* shows in a table the relationship between the position of the dynamic store, the phase value belonging thereto, and the data emitted by the decoder for the FIG. 1 circuit.

FIG. 2*a* shows the method of operation of the dynamic store using a time-waveform chart. The outputs of the three stages K1, K2, and K3 are shown, the binary output signals of the latter being coupled to the decoder. In the last line of this figure the portion of the carrier oscillation is shown at the output of gate G, which triggers the interrogation pulse. Depending on the setting of the three stages, the corresponding phase value is stored. The blocks of time from *t*1 to *t*2 mark the different phase values. The moments denoted with *t*1 through *t*9 show the corner points of the respective receiving tolerance, whose center indicates the target moment.

The table in FIG. 2*b* shows the relationship between phase value *t*, time block *t*, and position of the inversion stages K1, K2, and K3. The last three columns on the right-hand side of the table show the output signal of the decoder. Columns *a*1, *a*2, and *a*3 show the bits which are associated with a phase shift. Thus, for example, a phase shift of +45° is associated with the three bits (tribit) "010," whereas a −90° phase shift is associated with the tribit "000." A so-called gray-code is involved in association of the bits with the phase shifts in which each successive bit combination differs from the preceeding bit combination in only one bit. Since strong interference usually causes falsification of a phase shift in the preceeding or in the following phase shift value, the use of a gray-code has the advantage that only one of the three bits can be wrong.

To produce the bit combinations in columns *a*1, *a*2, and *a*3 the decoder must combine the phase value held in the dynamic store in binary form according to the following rules:

$a1 = K2 \oplus K3;$ $a2 = K3;$ $a3 = \overline{K1 \oplus K2};$ $\oplus$ means addition modulo 2.

For other associations between bit combinations and phase jumps there are other similarly simple combinations.

The decoding is accomplished with the two halfadders HA1 and HA2 arranged as in FIG. 1. The interrogation pulse appearing in FIG. 2*a* at the point of time of the occurrence of the positive going edge of the carrier oscillation meets the dynamic store in the position "001" in the period of time *t*4 to *t*5; this corresponds to a phase value of 135°. The decoder feeds the binary bit combination "111" into the parallel-series converter at the moment of the interrogation. The reference frequency or the carrier oscillation is shifted by a constant phase value of 22.5°, so that the interrogation of the dynamic store takes place in the middle of a time block and does not coincide with a carrier wave transition.

In FIG. 1, the received phase difference modulated carrier oscillation at input E is directed to a limiter-amplifier BV which forms therefrom a rectangular oscillation. The phase modulation information, at the output of the limiter, is contained only in the crossovers of the carrier frequency signal. The step-cycle of the modulation segments, indicated by cycle ST, opens gate G approximately in the middle of the modulation segment. The next following positive going edge of the clipped carrier signal, which corresponds to the phase 0° of the carrier oscillation, triggers an interrogation pulse in the pulse forming stage AT. Pulse former AT may be any conventional type of pulse forming or generating circuit which would be suitable for producing pulses having parameters, as discussed herein. The cycle ST and the bit cycle BT are taken from the quartz-stabilized oscillator RG over divider stages and corrected in phase by synchronizing equipment. Equipment for performing this task is well known and will not be further discussed herein. Compared to the cycle frequency ST, a high carrier frequency is of advantage, since the moment of interrogation of the dynamic store will then deviate only a little from the center of the modulation segment. Here the reference signal is scanned by the receiving signal.

The interrogation pulse opens gates G1, G2, and G3 and switches the stages K4, K5, and K6 of the parallel-series converter PSU into the binary states emitted by the decoder. If nothing is fed into stage K4, then a binary "1" is fed in with permanently set bias. The interrogation pulse arrives at the stages K1 to K3 of the dynamic store over the delay stage VS. Any conventional delay network will perform the function of stage VS adequately. The pulse sets the stages K1–K3 to the phase of the carrier oscillation at the moment of the interrogation pulse, namely to phase value 0°. The pulse for resetting the dynamic store to carrier phase 0° can also be taken from the trailing edge of the interrogation pulse or from the first negative going edge of the clipped carrier oscillation during a cycle ST pulse. Timing elements, as for example mono-stable flip-flop circuits, are also sufficient for the delay of the resetting pulse. The reference frequency, the phase position of which is given in advance by the preceeding interrogation process, amounts to a whole numbered multiple of the carrier frequency. With an 8-valued system the reference frequency receives eight times the value of the carrier frequency. The eight different phase values are defined by the three stages K1 to K3, as shown in FIGS. 2*a* and 2*b*.

The phase value determined at the moment of interrogation equals the phase difference, since the moment of interrogation is the phase 0° of the received signal. After the interrogation process, the phase of the carrier oscillation is necessarily fed into the dynamic store. Since the frequency divider thereupon is again controlled by the reference frequency, the stored phase remains and serves as reference phase for the next moment of interrogation. This process represents a dynamic storage. The compulsory insertion of the carrier phase into the dynamic store proceeds over known resetting i.e., clearing inputs provided with known flip-flop circuits. The delay element VS generates a delay of the resetting signal by one-eighth of a period of the carrier frequency.

Figure 3:
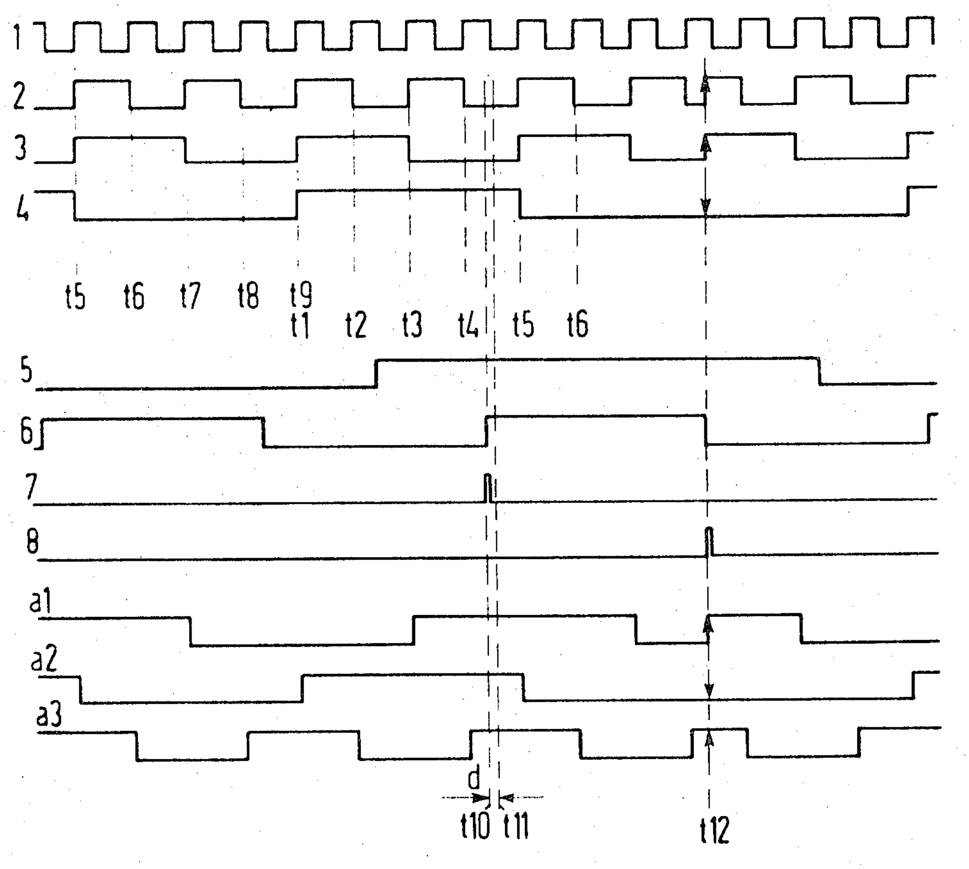
FIG. 3 is a time-waveform chart for the FIG. 1 circuit.

FIG. 3 shows a pulse diagram for the FIG. 1 circuit. The lines of the pulse diagram are provided with numbers and letters which are placed in FIG. 1 at the places where these pulse patterns appear. The time coordinate of the diagram shows an interrogatin moment and the moment when the carrier phase is stored. Time blocks *t1* to *t9*, which were explained in FIG. 2*a*, are also shown in this diagram. The interrogation proceeds to moment *t10*, since a positive going edge of the clipped carrier oscillation (line 6) then appears. The target moment of the interrogation is denoted *t11*. A deviation of duration *d* arises. The receiving range has a duration of *t4* – *t5*.

The incoming phase difference modulated carrier oscillations are, in consequence of the band limitation and through interference influences of the transmission line, replete with deviations of the target moment of their arrival, similar to the telegraphic distortions of data signals after demodulation, which have been transmitted binarily modulated. The deviation *d*, measured in scanning moment *t10*, can serve to regulate one of the known synchronizing circuits. In accordance with a frequently used method, the correction takes place continuously in small steps or in steps proportional to the size of the deviation *d*. In accordance with another known synchronization circuit, a correction occurs only when a one-sided deviation has been determined during a certain duration. The size of the correction steps must always be small compared to the size of the time segments for the phase values determined with aid of the reference frequency (cf. FIG. 2*a*). Simultaneously, regulating criteria for the connection of an adaptive corrector can be taken from the deviation. Therewith the phase-synchronized reference oscillator emits a quasi-coherent reference phase, which results from the mean values of the preceeding interrogation moments.

Line 1 in FIG. 3 shows this reference phase, which controls the dynamic store. Lines 2, 3, and 4 show the settings of the stages K1–K3 of the store. Line 5 shows the cycle ST, which designates the center of the modulation segment and releases the next positive going edge of the carrier oscillation (line 6) for triggering of an interrogation pulse (line 7). The interrogation pulse at moment t10 feeds the state of the counter of the dynamic store (lines 2, 3, and 4) into the parallel-series converter over the interrogation gates G1 to G3. The binary bit sequence "111" which was fed in corresponds to a phase jump of 135°.

The storing of the carrier phase in the dynamic store takes place with aid of a resetting pulse (line 8) which is formed, delayed in time, after the interrogation at moment *t12*. The storage causes a half carrier oscillation after the interrogation moment, so that, not the phase value 0°, but the phase value 180° must be stored, which corresponds to the time interval between interrogation pulse and reset pulse. At moment *t12*, the binary "1" is fed into the two stages K1 and K2 and the binary "0" is fed into the stage K3 (cf. FIG. 2*b*) (lines 2, 3, and 4). This phase, which corresponds to the carrier phase 0°, serves as reference phase for the next interrogation.

Figure 4:
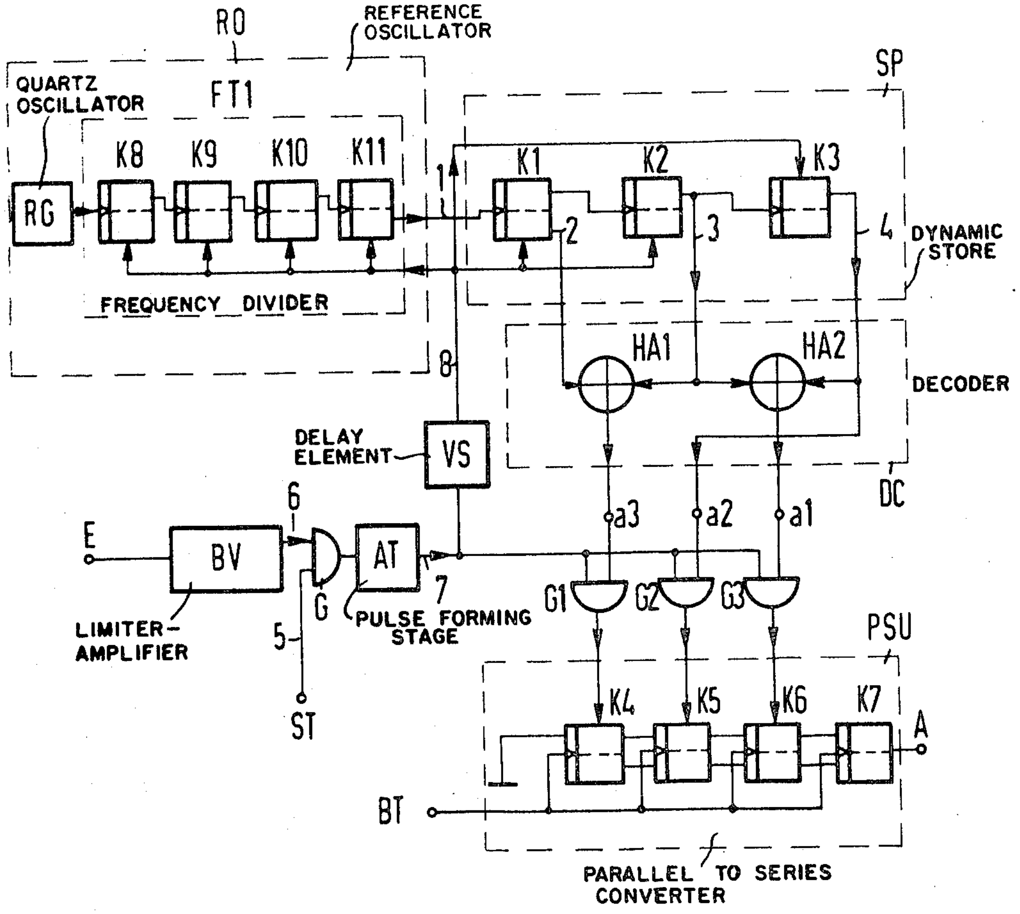
FIG. 4 shows a demodulator constructed according to the principle of differential coherent demodulation.

FIG. 4 shows an example of a demodulator of the invention constructed according to the differential-coherent modulation principle for reception of an 8-valued phase difference modulated carrier frequency signal. The reference frequency is formed with aid of a fixed-phase quartz-stabilized oscillator RG which emits a rectangular oscillation, and with aid of the frequency divider stages K8 to K11. The reference frequency has n times the value of the carrier oscillation, whenever n phase stages are possible. The dynamic storing, the decoding, and the issuing of the bit combinations proceed in the same way as discussed with reference to FIGS. 1, 2*a*, 2*b*, and 3. With the storing there exists the requirement that the phase of the incoming signal be transferred to the dynamic store as precisely as possible. Thus, at the moment of storing, besides the stages K1, K2, and K3, the stages K8, K9, K10 and K11 are also reset to the output state through storing of a binary "1." The phase is essentially set anew with each modulation segment and is thereby needed only for the duration of one modulation segment. For this reason the frequency errors arising in practical operation between reference oscillator and incoming data signal carrier have no meaning for all intents and purposes. With a carrier frequency of 27 kHz, a frequency error range of ± 6 Hz, and a transmission speed of 1,200 Baud the resulting phase error amounts to only approximately 1.8°. The deviation d appearing during the interrogation process at moment *t*10 (FIG. 3) is contained in the reference phase for the succeeding interrogation in the middle of the next modulation segment, so that the generally useable receiving area of tolerance can be reduced.

The descriptions of preferred embodiments given hereinabove are intended only to be exemplary of the principles of the invention and are not definitive of the scope of the invention. The scope of the invention can be learned only by reference to the appended claims.

I claim:

1. Apparatus for modulating a received phase difference modulated data signal wherein binary coded data are transmitted by modulating a carrier frequency with at least one specific phase shift corresponding to at least one data level, comprising:

reference oscillator means for generating a frequency signal with *n'*-valued phase difference modulation having *n* times the value of the carrier frequency, n being the expected number of phase shifts in the said received signal, first frequency divider means constituted by a plurality of divider stages for reducing said reference frequency to said carrier frequency, first generating means for generating an interrogation pulse in the middle portion of a modulation segment, said generating means being triggered by a cross over of said received modulated carrier, decoder means for receiving the outputs of said divider stages including said carrier frequency and reconstituting therefrom the binary coded data signal, first gating means for making available the outputs of said decoder means responsive to the appearance of said interrogation pulse at said first gating means and second generating means for generating a reset signal, said reset signal being coupled to said divider stages for resetting same to a position corresponding to the phase state of the carrier oscillation at the instant of appearance of said interrogation pulse.

2. The apparatus defined in claim 1 further comprising:

second gating means for connecting said received signal to said apparatus for a predetermined time interval and wherein the output of said second gating means is connected to said first generating means.

3. The apparatus defined in claim 1 wherein said first gating means comprises a number of gates corresponding to the number of said divider stages and the outputs of said gates are in parallel and further comprising:

converter means for converting the outputs of said first gating means from parallel to series data signals and timing means for controlling the operation of said converter means.

4. The apparatus defined in claim 3 wherein said decoder means comprises half-adder circuits connected to said divider stages.

5. The apparatus defined in claim 2 wherein said second generating means comprises delay means connected to the output of said first generat-ing means for delaying said interrogation pulse for a predetermined time interval and for applying same to said frequency divider means as said reset signal.

6. The apparatus defined in claim 1 wherein said reference oscillator generates signals of rectangular waveform having a frequency equal to a whole numbered multiple of n times the carrier frequency and further comprising:

second frequency divider means for dividing the output of said reference oscillator to a frequency equal to n times the carrier frequency, the output of said second frequency divider means being connected to an input of said first frequency divider means.

7. The apparatus defined in claim 6 further comprising:

synchronization means connected between said reference oscillator and said second divider means, said interrogation pulse being coupled to said synchronization means, for comparing the time position of said interrogation pulse with a predetermined time position and for making a phase correction when a difference occurs.

* * * * *